(12) United States Patent
Komiya

(10) Patent No.: US 9,841,079 B2
(45) Date of Patent: Dec. 12, 2017

(54) DEVICE FOR GUIDING ELONGATE OBJECT

(71) Applicant: TSUBAKIMOTO CHAIN CO., Osaka-shi, Osaka (JP)

(72) Inventor: Shoichiro Komiya, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 15/325,507

(22) PCT Filed: Jul. 17, 2015

(86) PCT No.: PCT/JP2015/070584
§ 371 (c)(1),
(2) Date: Jan. 11, 2017

(87) PCT Pub. No.: WO2016/017461
PCT Pub. Date: Feb. 4, 2016

(65) Prior Publication Data
US 2017/0146095 A1    May 25, 2017

(30) Foreign Application Priority Data

Aug. 1, 2014  (JP) .................... 2014-157602

(51) Int. Cl.
*F16G 13/16* (2006.01)
*H02G 11/00* (2006.01)

(52) U.S. Cl.
CPC ........... *F16G 13/16* (2013.01); *H02G 11/006* (2013.01)

(58) Field of Classification Search
CPC ......... F16G 13/16; H02G 11/006; F16L 11/00
(Continued)

(56) References Cited

U.S. PATENT DOCUMENTS 5,174,104 A * 12/1992 Wehler .................... F16G 13/16
                                                        248/49
5,771,676 A    6/1998 Komiya et al.
(Continued)

FOREIGN PATENT DOCUMENTS

JP         5-141481 A    6/1993
JP         9-119485 A    5/1997
(Continued)

OTHER PUBLICATIONS

International Search Report dated Sep. 15, 2015, issued in counterpart International Application No. PCT/JP2015/070584 (2 pages).
(Continued)

*Primary Examiner* — David B Jones
(74) *Attorney, Agent, or Firm* — Westerman, Hattori, Daniels & Adrian, LLP

(57) ABSTRACT

A device for guiding a long object includes links. Each link has a pair of link portions opposite to each other in a first direction. The links are coupled together while being arranged in series in a second direction. At the opposite ends of each link in a third direction, the two link portions are coupled to each other by a pair of arms. The space defined and surrounded by the link portions and the arms constitute an accommodation space for accommodating long objects. The link portions have restricting portions, which restrict pivoting motion range of link portions adjacent in the second direction. Engagement between the restricting portions of adjacent link portions restricts the pivoting motion range to a predetermined angular range. The link portions have a resistance applying portion, which applies rotational resistance.

5 Claims, 7 Drawing Sheets

(58) Field of Classification Search
USPC .......................................................... 59/78.1
See application file for complete search history.

(56) References Cited

U.S. PATENT DOCUMENTS

| | | | |
|---|---|---|---|
| 6,016,844 | A | 1/2000 | Takahashi et al. |
| 7,040,081 | B2 * | 5/2006 | Komiya ................ F16G 13/16 248/49 |
| 7,966,800 | B2 * | 6/2011 | Kemper ................ F16G 13/16 248/49 |

FOREIGN PATENT DOCUMENTS

| | | |
|---|---|---|
| JP | 11-164462 A | 6/1999 |
| JP | 2009-41631 A | 2/2009 |
| JP | 2011-241968 A | 12/2011 |

OTHER PUBLICATIONS

English translation of International Preliminary Report on Patentability dated Feb. 7, 2017, issued in counterpart ntemational Application No. PCT/JP2015/070584. (7 pages).

* cited by examiner

DEVICE FOR GUIDING ELONGATE OBJECT

BACKGROUND OF THE INVENTION

The present invention relates to a device for guiding a long object, which is, for example, a flexible cable for supplying electricity or a hose for supplying fluid to a movable unit, such as a machine tool, in accordance with movement of the movable unit with the long object accommodated in the device.

This type of long object guiding device includes links coupled to each other in a longitudinal direction. Each link includes a pair of opposed link plates (link portions). The link plates of each pair are coupled to each other by a first arm and a second arm, which is opposed to the first arm (for example, refer to Patent Document 1). Each pair of link plates, each first arm, and each second arm define an accommodation space, which accommodates a long object.

Each link plate has a coupling pin hole at the front side section. Each link plate has a coupling pin at the rear side section. In each pair of adjacent front and rear link plates, the coupling pin hole of one of the link plates receives the coupling pin of the other link plate, so that the link plates are pivotally coupled to each other.

Each link plate has a restricting recess and a restricting projection at the front side section and the rear side section, respectively, to restrict the range of flexing motion. In each pair of adjacent front and rear link plates, the restricting recess in the rear side section of the front link plate receives the restricting projection in the front side section of the rear link plate. Further, the restricting recess in the front side section of the rear link plate receives the restricting projection in the rear side section of the front link plate.

Relative movement of each restricting recess and the associated restricting projection restricts the flexing motion range (pivoting range) in the front side section and the rear side section of the adjacent front and rear link plates. This allows for switching between a flexed position for flexing movement and a straight position for straight movement, so that long objects are smoothly protected and guided.

PRIOR ART DOCUMENT

Patent Document

Patent Document 1: Japanese Laid-Open Patent Publication No. 2009-41631

SUMMARY OF THE INVENTION

Problems that the Invention is to Solve

However, when the long object guiding device of Patent Document 1 is used, each restricting recess and the associated restricting projection contact each other when restricting the flexing motion range of the front side section and the rear side section of a pair of front and rear adjacent link plates. The impact of such contact produces noise.

Accordingly, it is an objective of the present invention to provide a device for guiding a long object that is capable of suppressing the occurrence of noise during use.

Means and operational advantages for solving the above-described problem will now be described.

To achieve the foregoing objective and in accordance with one aspect of the present invention, a device for guiding a long object is provided that includes a plurality of links, pairs of link portions each provided in each link, and pairs of arms. The link portions of each pair are opposed to each other in a first direction. Each pair of arms couples the link portions of each pair to each other. The links are coupled together while being arranged in series in a second direction, which is orthogonal to the first direction. Each link has a first end and a second end in a third direction, which is orthogonal to both the first direction and the second direction. The link portions of each pair are coupled to each other by the corresponding pair of the arms at the first end and the second end of the link. The pairs of the link portions and the pairs of the arms define an accommodation space, which extends in the second direction and accommodates a long object. Each link portion includes a restricting portion, which restricts a pivoting range of link portions that are adjacent to each other in the second direction. Engagement between the restricting portions of two link portions adjacent to each other in the second direction restricts the pivoting range to a predetermined angular range. Each link portion includes a resistance applying portion. When two link portions adjacent to each other in the second direction are caused to pivot on each other, the corresponding resistance applying portion applies rotational resistance due to elastic force to the link portions at least in part of the pivoting range.

With this configuration, when two link portions that are adjacent to each other in the second direction pivot on each other, the resistance applying portion applies rotational resistance to the link portions. This suppresses the impact noise produced when the restricting portions of the link portions contact each other. Therefore, the noise produced during the use of the long object guiding device is suppressed.

In the above described device for guiding a long object, each resistance applying portion preferably includes a first attached portion, which is attached to one of two link portions adjacent to each other in the second direction, a second attached portion, which is attached to the other link portion, and a coupling portion, which couples the first attached portion and the second attached portion to each other. The coupling portion is preferably made of an elastic material.

With this configuration, when two link portions that are adjacent to each other in the second direction pivot on each other, the coupling portion, which is made of an elastic material, is elastically deformed. Thus, the elastic force of the coupling portion can be applied as the rotational resistance between the link portions.

In the above described device for guiding a long object, each link portion preferably has a first end and a second end in the second direction, and each resistance applying portion preferably includes a projection, which is provided at the first end and is made of an elastic material, and a receiving portion, which is provided at the second end and is capable of receiving the projection. The projection is preferably received by the receiving portion when the corresponding two link portions adjacent to each other in the second direction are coupled to each other to partly overlap with each other in the first direction.

With this configuration, when two link portions that are adjacent to each other in the second direction pivot on each other, the projection, which is made of an elastic material, is elastically deformed. Thus, the elastic force of the projection can be applied as the rotational resistance between the link portions.

In the above described device for guiding a long object, each projection is preferably received by the corresponding receiving portion with the corresponding two link portions adjacent to each other in the second direction held at a position corresponding to a midpoint in the pivoting range.

With this configuration, when two link portions that are adjacent to each other in the second direction pivot on each other, the amount of elastic deformation of the projection is reduced. This improves the durability of the projection.

In the above described device for guiding a long object, each link portion preferably has a first end and a second end in the second direction, and each resistance applying portion preferably includes a projection, which is provided at the first end and is made of an elastic material, and an accommodating portion, which is provided at the second end and is capable of accommodating the projection. The projection is preferably accommodated in the accommodating portion when the corresponding two link portions adjacent to each other in the second direction are coupled to each other to partly overlap with each other in the first direction. When the link portions pivot on each other while at an end in the pivoting range of the link portions, part of the corresponding projection preferably contacts the corresponding accommodating portion and is elastically deformed to apply rotational resistance to the link portions.

With this configuration, when two link portions that are adjacent to each other in the second direction pivot on each other, the resistance applying portion applies rotational resistance to the link portions only in a period from immediately before the restricting portions, which limit the pivoting range, engage with each other to when the limiting portions engage with each other. Thus, pivoting motion of the link portions is not unnecessarily hindered by the rotational resistance.

The present invention suppresses the occurrence of noise during use.

DETAILED DESCRIPTION OF THE PREFERRED EMBODIMENTS

First Embodiment

A device for guiding a long object according to a first embodiment will now be described with reference to the drawings.

Figure 1:
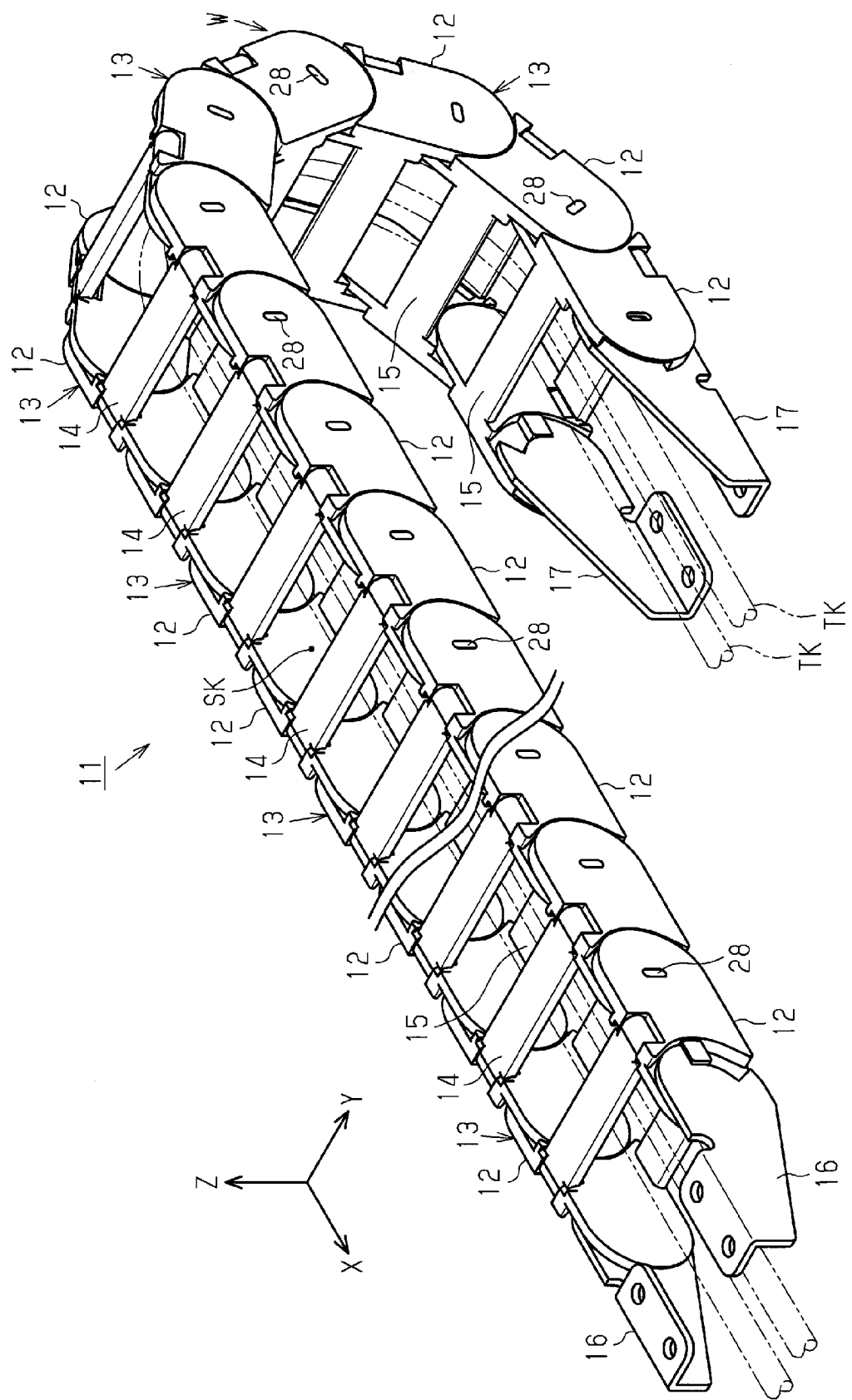
FIG. 1 is a perspective view of a device for guiding a long object according to a first embodiment.

As shown in FIG. 1, a long object guiding device 11 includes links 13. Each link 13 has two link portions 12, which are made of synthetic plastic and opposed to each other in a first direction Y. The links 13 are coupled together while being arranged in series in a second direction X, which is orthogonal to the first direction Y. The first direction Y corresponds to the width direction of the long object guiding device 11, and the second direction X corresponds to the direction of the arrangement in series.

The link portions 12 in each pair are coupled to each other by a first arm 14 and a second arm 15 at a first end and a second end in a third direction Z of the link 13. The first arm and the second arm are each shaped as a rectangular plate. The third direction Z is orthogonal to both the first direction Y and the second direction X, and corresponds to the thickness direction of the long object guiding device 11.

Each first arm 14 is detachably and pivotally attached to the corresponding pair of the link portions 12, while each second arm 15 is formed integrally with the corresponding pair of the link portions 12. The first arms 14 and the second arms 15, which constitute the long object guiding device 11, are opposed each other in the third direction Z.

First brackets 16 are coupled to one of the links 13 that is located at the beginning in the second direction X. The first brackets 16 are coupled to a movable body (not shown) that reciprocates in the second direction X. Second brackets 17 to be secured to a fixed portion (not shown) are coupled to one of the links 13 that is located at the end in the second direction X.

The pairs of the link portions 12 and the pairs of the first and second arms 14, 15 of the links 13 define a space that extends in the second direction X and forms an accommodation space SK. The accommodation space SK accommodates long objects TK, which are bendable in a flexible manner. The long object guiding device 11 guides the long objects TK accommodated in the accommodation space SK in accordance with reciprocation of the movable body (not shown) coupled to the first brackets 16, while protecting the long objects TK.

In this case, the long object guiding device 11 is arranged to have a curved portion W in the middle section. The curved portion W moves in accordance with reciprocation in the second direction X of the movable body (not shown) coupled to the first brackets 16.

The long objects TK may be, for example, electric cables for supplying electricity to the movable body (not shown), optical fiber cables for transmitting signals to the movable body (not shown), hoses for supplying gas (for example, air) or liquid (for example, water or oil) to the movable body (not shown), and long articulated members capable of flexing.

The configuration of the link portions 12 will now be described.

Figure 2:
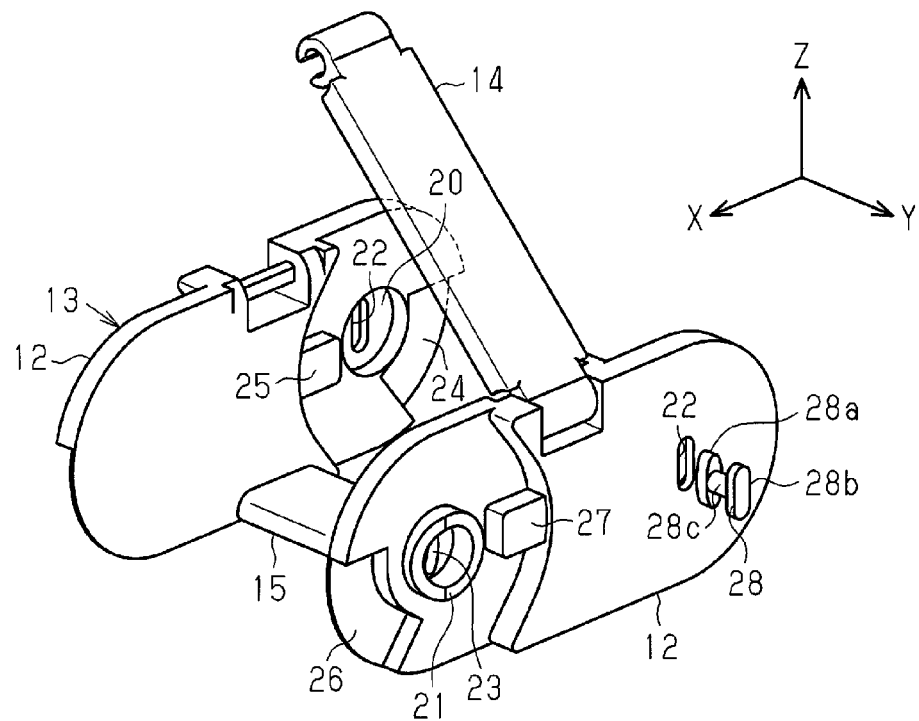
FIG. 2 is a perspective view of part of the long object guiding device shown in FIG. 1.
Figure 3:
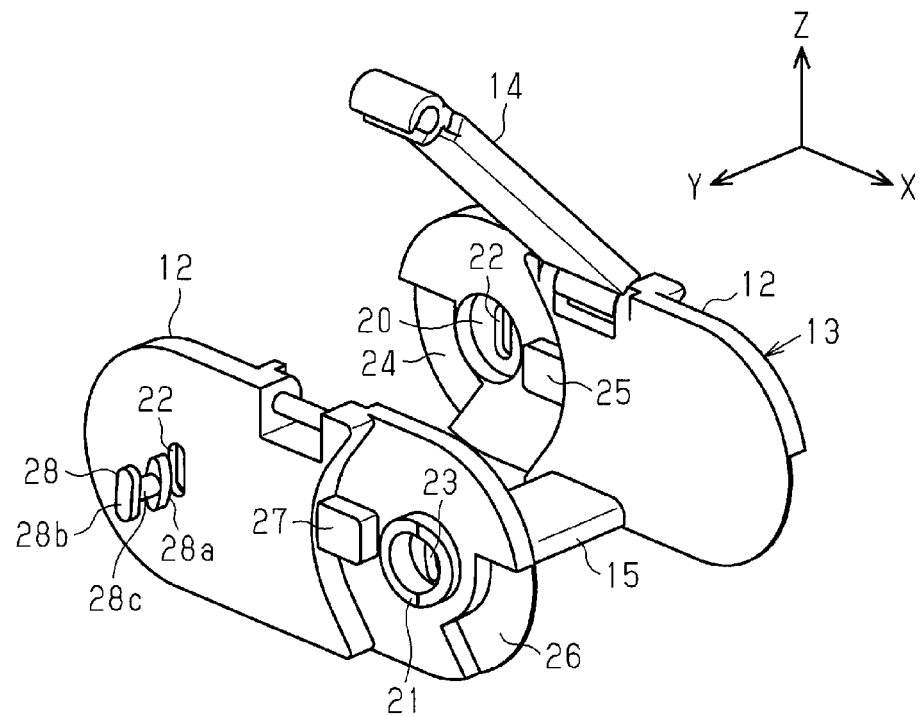
FIG. 3 is a perspective view of the part of the long object guiding device shown in FIG. 2, as viewed from the opposite side.

As shown in FIGS. 2 and 3, each link portion 12 is substantially shaped as a rectangular plate with rounded ends in the second direction X. Each link portion 12 has a circular coupling recess 20 in the inner surface of the first end in the second direction X and an annular coupling projection 21 on the outer surface of the second end in the second direction X. The coupling projection 21 of each link portion 12 is pivotally fitted to the coupling recess 20 of another link portion 12 adjacent in the second direction X.

Each link portion 12 has an elongated hole 22 at the center of the bottom of the coupling recess 20. The elongated hole 22 extends through the link portion 12 in the first direction Y. The elongated hole 22 has a shape extending in the third direction Z. Each link portion 12 has a recess 23 at the center of the inside of the coupling projection 21. The recess 23 has a shape extending in the third direction Z. The width at the ends of the recess 23 is narrower than the width at the ends of the elongated hole 22. That is, the recess 23 has an elliptic arcuate shape at the ends, while the elongated hole 22 has a circular arcuate shape at the ends.

Each link portion 12 has a sectorial inner recess 24 on the inner surface at the end close to the coupling recess 20 in the second direction X. Each link portion 12 has a rectangular parallelepiped-shaped inner projection 25 on the inner surface. The inner projection 25 is located on the opposite side of the coupling recess 20 to the inner recess 24 in the second direction X. Each link portion 12 has a sectorial outer recess 26 on the outer surface at the end close to the coupling projection 21 in the second direction X. Each link portion 12 has a rectangular parallelepiped-shaped outer projection 27 on the outer surface. The outer projection 27 is located on the opposite side of the coupling projection 21 to the outer recess 26 in the second direction X.

In two links 13 that are adjacent to each other in the second direction X, when the coupling recesses 20 of the link portions 12 of one of the links 13 and the coupling projections 21 of the link portions 12 of the other link 13 are fitted to each other, the outer projections 27 are accommodated in the inner recesses 24, and the inner projections 25 are accommodated in the outer recesses 26. The inner projections 25 and the outer projections 27 are respectively slidable in the circumferential direction of the coupling recesses 20 in the outer recesses 26 and the inner recesses 24 within a predetermined angular range (50° in the present embodiment).

The predetermined angular range corresponds to the pivoting range (pivotal angular range) of two links 13 (the link portions 12) adjacent to each other in the second direction X. That is, the outer surface of each outer projection 27 engages with the inner surface of the corresponding inner recess 24, and the inner surface of each outer recess 26 engages with the outer surface of the corresponding inner projection 25, so that the pivoting range of two links 13 (the link portions 12) adjacent to each other in the second direction X is restricted to the predetermined angular range.

Figure 5:
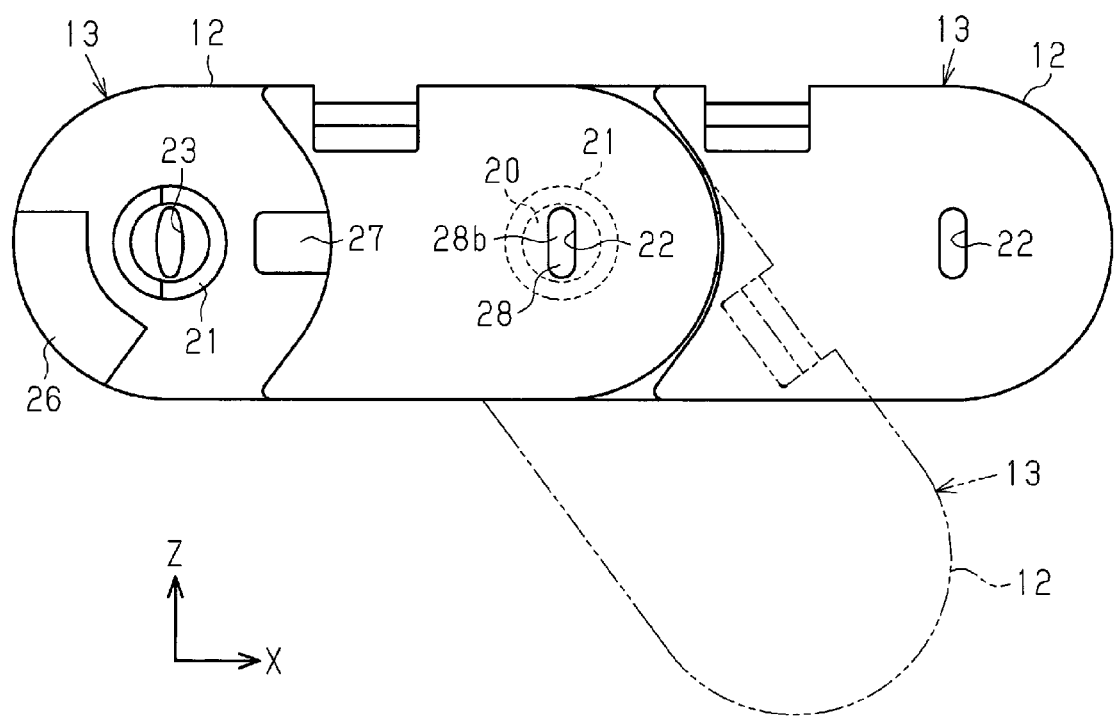
FIG. 5 is a side view illustrating a state in which the link portions shown in FIG. 4 pivot on each other.

In this case, as shown in FIG. 5, two link portions 12 (links 13) adjacent to each other in the second direction X pivot on each other between a straight position (the position shown by solid lines in FIG. 5), at which the longitudinal axes of the two link portions 12 agrees with each other, and a flexed position (the position shown by long dashed double-short dashed lines in FIG. 5), at which the longitudinal axes of the two link portions 12 intersect each other at a predetermined angle (50° in the present embodiment). In the present embodiment, the inner recess 24, the inner projection 25, the outer recess 26, and the outer projection 27 constitute a restricting portion.

Figure 4:
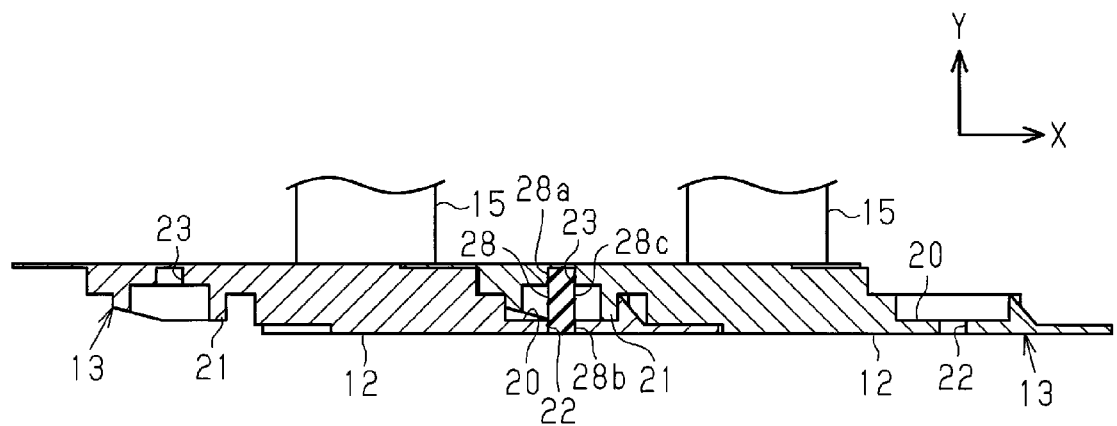
FIG. 4 is a cross-sectional view of the coupled parts of the link portions according to the embodiment shown in FIG. 1.

As shown in FIGS. 2 and 4, an elastic member 28, which is a resistance applying portion, is attached to two link portions 12 adjacent to each other in the second direction X. When pivoting on each other, the two link portions 12, which are coupled to each other in the second direction X, receive rotational resistance due to the elastic force of the elastic member 28. The elastic member 28 is made of an elastic material such as elastomer. The elastic member 28 includes a first attached portion 28a, a second attached portion 28b, and a coupling portion 28c, which couples the first attached portion 28a and the second attached portion 28b to each other. The first attached portion 28a is detachably fitted in the recess 23 of one of the two links 12, which are adjacent to each other in the second direction X, while the second attached portion 28b is detachably fitted in the elongated hole 22 of the other link portion 12.

The first attached portion 28a has a shape that corresponds to the recess 23, and the second attached portion 28b has a shape that corresponds to the elongated hole 22. That is, the first attached portion 28a has an elliptic arcuate shape at the ends, while the second attached portion 28b has a circular arcuate shape at the ends. The coupling portion 28c is shaped as a column that extends in the first direction Y and couples the centers of the first attached portion 28a and the second attached portion 28b to each other. The elastic member 28 substantially has an H shape as a whole.

Operation of the long object guiding device 11 will now be described.

When the movable body (not shown) reciprocates in the second direction X, the long object guiding device 11 reciprocates in the second direction X so that the curved portion W is displaced to follow the movable body (not shown). The long objects TK are accommodated in the accommodation space SK of the long object guiding device 11. While being protected in the accommodation space SK, the long objects TK are guided by the long object guiding device 11 to follow the movement of the movable body (not shown). At this time, in the long object guiding device 11, any two link portions 12 (links 13) that are adjacent to each other in the second direction X are caused to repeatedly pivot on each other between the straight position and the flexed position in accordance with the reciprocation of the curved portion W.

Next, operation will be described in which two link portions 12 (links 13) that are adjacent to each other in the second direction X pivot on each other between the straight position and the flexed position.

When causing two link portions 12 that are adjacent to each other in the second direction X to pivot on each other from the straight position to the flexed position, one of the link portions 12 (the right one as viewed in FIGS. 4 and 5) is caused to pivot on the other link portion 12 (the left one as viewed in FIGS. 4 and 5) toward the side corresponding to the flexed position.

Then, the outer surface of the outer projection 27 contacts and engages with the inner surface of the inner recess 24 on a side corresponding to the flexed position, and the outer surface of the inner projection 25 contacts and engages with the inner surface of the outer recess 26 on a side corresponding to the flexed position. This achieves the flexed position of the two links 13 (the link portions 12), which are adjacent to each other in the second direction X. At this time, the coupling portion 28c of the elastic member 28 is elastically deformed in a twisting manner, and the elastic force that accompanies the elastic deformation of the coupling portion 28c is applied, as rotational resistant, to the link portions 12 when the link portions 12 are caused to pivot on each other from the straight position to the flexed position.

This alleviates the impact of the contact of the outer surface of the outer projection 27 with the inner surface of the inner recess 24 and the impact of the contact of the outer surface of the inner projection 25 with the inner surface of the outer recess 26, thereby suppressing the impact noise produced by such contact. This suppresses the occurrence of noise during the use of the long object guiding device 11.

The above described first embodiment achieves the following advantages.

(1) The long object guiding device 11 has the elastic members 28, each of which applies rotational resistance due to the elastic force to two link portions 12 that are adjacent to each other in the second direction X when the link portions 12 pivot on each other. When the link portions 12 pivot on each other, the coupling portion 28c is elastically deformed in a twisting manner, so that the elastic force of the coupling portion 28c is applied as rotational resistance to the link portions 12, which are pivoting on each other. This alleviates the impact of the contact of the outer surface of the outer projection 27 with the inner surface of the inner recess 24 and the impact of the contact of the outer surface of the inner projection 25 with the inner surface of the outer recess 26, which are produced when the link portions 12 pivot on each other from the straight position to the flexed position. Thus, the impact noise produced due to the contact is suppressed. This suppresses the occurrence of noise during the use of the long object guiding device 11.

(2) Since the first attached portion 28a and the second attached portion 28b have different shapes, the orientation of the elastic member 28 is easily determined when it is installed in the link 13. In addition, the elastic member 28 can be installed after the links 13 are coupled to each other. Thus, the elastic member 28 is easily attached to the links 13.

(3) Even a high speed operation of the long object guiding device 11 merely twists the coupling portion 28c of each elastic member 28. Thus, the rotational resistance applied to the link portions 12 is maintained at a constant value when the link portions 12 pivot on each other. Therefore, the noise during operation of the long object guiding device 11 is maintained at a constant level regardless of the operating speed.

(4) The coupling portion 28c of the elastic member 28 has a perfect circle cross-section. Thus, when the link portions 12 pivot on each other, the rotational resistance applied by the elastic members 28 is equalized.

Second Embodiment

A long object guiding device according to a second embodiment will now be described with reference to the drawings. The differences from the first embodiment will mainly be discussed, and detailed explanations of the common features are omitted. The same reference numerals are given to those components that are the same as the corresponding components of the first embodiment.

Figure 6:
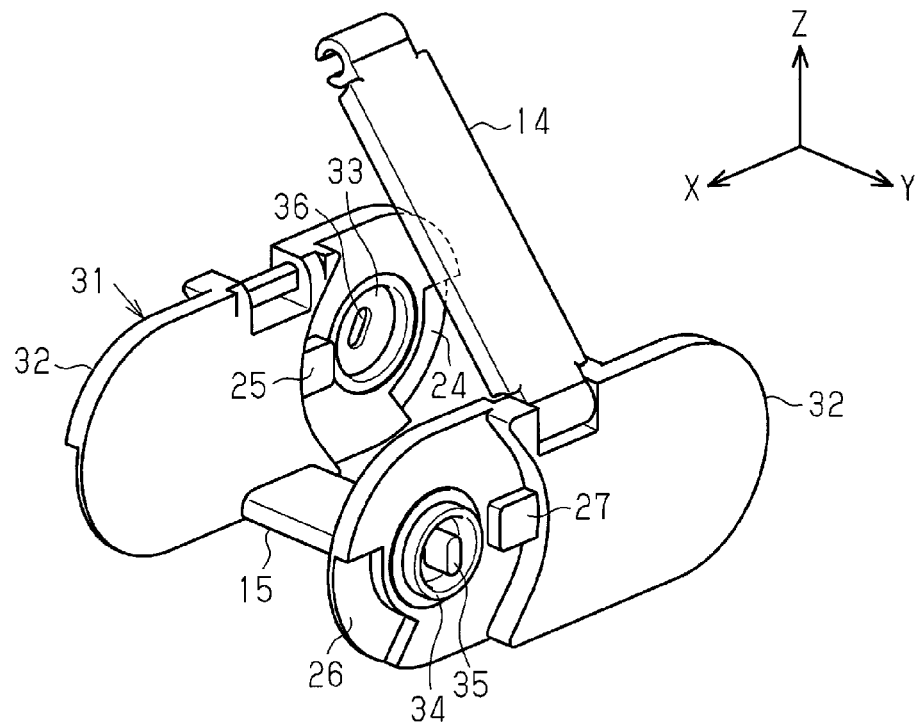
FIG. 6 is a perspective view of part of a device for guiding a long object according to a second embodiment.
Figure 7:
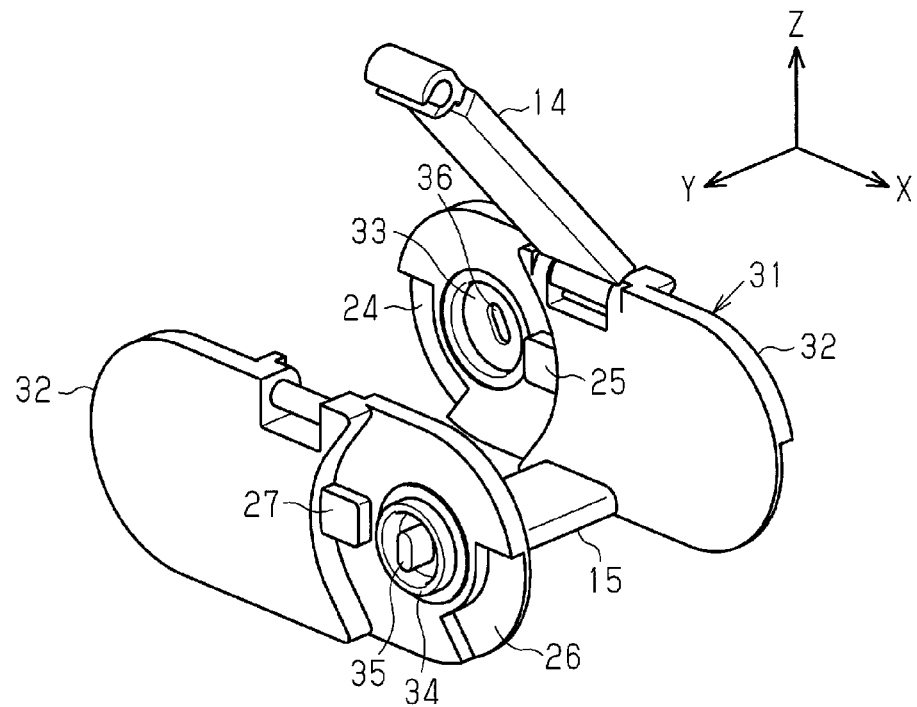
FIG. 7 is a perspective view of the part of the long object guiding device shown in FIG. 6, as viewed from the opposite side.

As shown in FIGS. 6 and 7, the long object guiding device 11 according to the second embodiment is different from that of the first embodiment in that the links 13 are replaced by links 31. Each link 31 has link portions 32, which are shaped as rectangular plates with curved ends in the second direction X. Each link portion 32 has a circular coupling recess 33 in the inner surface of the first end in the second direction X and an annular coupling projection 34 on the outer surface of the second end in the second direction X. The coupling projection 34 of each link portion 32 is pivotally fitted to the coupling recess 33 of another link portion 32 adjacent in the second direction X.

Each link portion 32 has a plate-shaped projection 35 at the center of the inside of the coupling projection 34. The projection 35 linearly projects outward in the first direction Y. The distal end of the projection 35 extends slightly further outward in the first direction Y than the distal end of the coupling projection 34. Each link portion 32 has a receiving recess 36 at the center of the bottom of the coupling recess 33. The receiving recess 36 functions as a receiving portion for receiving the projection 35. The receiving recess 36 has an elongated shape.

Thus, the projection 35 is provided at a first end in the second direction X of the link portion 32, and the receiving recess 36 is provided at a second end. The coupling recess 33, the receiving recess 36, the coupling projection 34, and the projection 35 are made of an elastic material such as elastomer and formed through two-color molding.

The longitudinal axis of the receiving recess 36 is inclined relative to the third direction Z by a predetermined angle (25° in the present embodiment) in accordance with the flexed position of two link portions 32 adjacent to each other in the second direction X. Specifically, the longitudinal axis of the receiving recess 36 is inclined in the third direction Z by half the angle between the longitudinal axes of two link portions 32 adjacent to each other in the second direction X when the link portions 32 are at the flexed position (50° in the present embodiment). In other words, the longitudinal axis of the receiving recess 36 intersects the third direction Z at a predetermined angle (25° in the present embodiment).

The receiving recess 36 has a circular arcuate shape at the ends in the longitudinal direction. The cross-sectional shape of the projection 35 corresponds to the shape of the receiving recess 36 and can be received by the receiving recess 36. The longitudinal direction of the cross-section of the projection 35 agrees with the third direction Z. The second arm 15 in the present embodiment is detachably attached to the link portions 32. In the present embodiment, the projection 35 and the receiving recess 36 constitute a resistance applying portion.

When the coupling recess 33 and the coupling projection 34 of two link portions 32 that are adjacent to each other in the second direction X are fitted to each other, the link portions 32 partly overlap with each other in the first direction Y, and the distal end of the projection 35 is received by the receiving recess 36. At this time, since the longitudinal axis of the receiving recess 36 is inclined relative to the third direction Z by 25°, the link portions 32 are coupled to each other with the longitudinal axes thereof define an angle of 25°, which is half the pivoting range of the link portions 32. The position of the link portions 32 corresponds to an initial position.

Next, operation will be described in which two link portions 32 (links 31) that are adjacent to each other in the second direction X pivot on each other from the initial position to the straight position or the flexed position.

Figure 8:
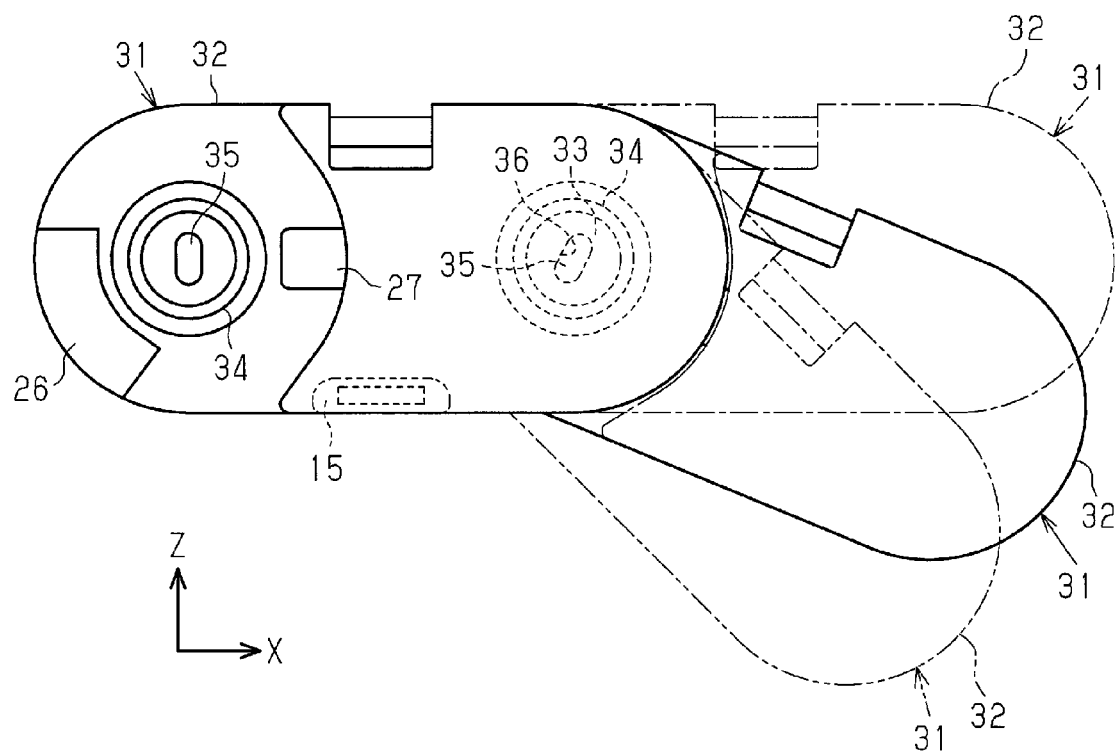
FIG. 8 is a side view illustrating a state in which the link portions according to the embodiment of FIG. 6 pivot on each other.

When causing two link portions 32 that are adjacent to each other in the second direction X to pivot on each other from the initial position to the straight position, one of the link portions 32 (the right one as viewed in FIG. 8) is caused to pivot on the other link portion 32 (the left one as viewed in FIG. 8) such that the link portions 32 are shifted from the initial position (the position shown by solid lines in FIG. 8) to the straight position (the position shown by long dashed short dashed lines in FIG. 8).

Then, the outer surface of the outer projection 27 contacts and engages with the inner surface of the inner recess 24 on a side corresponding to the straight position, and the outer surface of the inner projection 25 contacts and engages with the inner surface of the outer recess 26 on a side corresponding to the straight position. This achieves the straight position of the two link portions 32 (the links 31), which are adjacent to each other in the second direction X.

At this time, the projection 35 is elastically deformed in a twisting manner, and the elastic force that accompanies the elastic deformation of the projection 35 is applied to the link portions 32 when the link portions 32 are caused to pivot on each other from the initial position to the straight position. This alleviates the impact of the contact of the outer surface of the outer projection 27 with the inner surface of the inner recess 24 and the impact of the contact of the outer surface of the inner projection 25 with the inner surface of the outer recess 26, thereby suppressing the impact noise produced by such contact.

In contrast, when causing two link portions 32 that are adjacent to each other in the second direction X to pivot on each other from the initial position to the flexed position, one of the link portions 32 (the right one as viewed in FIG. 8) is caused to pivot on the other link portion 32 (the left one as viewed in FIG. 8) such that the link portions 32 are shifted from the initial position (the position shown by solid lines in FIG. 8) to the flexed position (the position shown by long dashed double-short dashed lines in FIG. 8).

Then, the outer surface of the outer projection 27 contacts and engages with the inner surface of the inner recess 24 on a side corresponding to the flexed position, and the outer surface of the inner projection 25 contacts and engages with the inner surface of the outer recess 26. This achieves the flexed position of the two link portions 32 (the links 31), which are adjacent to each other in the second direction X.

At this time, the projection 35 is elastically deformed in a twisting manner, and the elastic force that accompanies the elastic deformation of the projection 35 is applied to the link portions 32 when the link portions 32 are caused to pivot on each other from the initial position to the flexed position. This alleviates the impact of the contact of the outer surface of the outer projection 27 with the inner surface of the inner recess 24 and the impact of the contact of the outer surface of the inner projection 25 with the inner surface of the outer recess 26, thereby suppressing the impact noise produced by such contact.

As described above, in the second embodiment, the initial position is defined as an angular position corresponding to half the angle between the straight position and the flexed position. Thus, when the link portions 32 are caused to pivot on each other between the straight position and the flexed position, the rotational resistance applied to the link portions 32 when the link portions 32 are caused to pivot on each other from the initial position to the straight position is equal to the rotational resistance applied to the link portions 32 when the link portions 32 are caused pivot on each other from the initial position to the flexed position.

This suppresses, by the same degree, both the impact noise (noise) produced when the link portions 32 are shifted to the straight position and the impact noise (noise) produced when the link portions 32 are shifted to the flexed position. This effectively suppresses the occurrence of noise during the use of the long object guiding device 11.

The above described second embodiment achieves the following advantages.

(5) In the long object guiding device 11, when two link portions 32 that are adjacent to each other in the second direction X are coupled to each other, the projection 35 is received by the receiving recess 36. Since the projection 35 is elastically deformed in a twisting manner when the link portions 32 pivot on each other, the elastic force of the projection 35 can be applied to the link portions 32 as rotational resistance. This alleviates the impact of the contact of the outer surface of the outer projection 27 with the inner surface of the inner recess 24 and the impact of the contact of the outer surface of the inner projection 25 with the inner surface of the outer recess 26, which are produced when the link portions 32 pivot on each other between the straight position and the flexed position. Thus, the impact noise produced due to the contact is suppressed. This suppresses the occurrence of noise during the use of the long object guiding device 11.

(6) In the long object guiding device 11, each projection 35 is received by the corresponding receiving recess 36 with the corresponding two link portions 32 adjacent to each other in the second direction X held at a position corresponding to a midpoint in the pivoting range, that is, at the position (initial position) located at half the angular range from the straight position to the flexed position. Thus, compared to a case in which the initial position is set as the straight position or the flexed position of the link portions 32, the amount of elastic deformation (amount of twisting) of the projection 35 when the link portions 32 pivot on each other is reduced. This improves the durability of the projection 35.

(7) The receiving recess 36 and the projection 35, which constitute a resistance applying portion, are formed through two-color molding with the link portion 32. Thus, unlike a case in which a resistance applying portion is formed as a separate component, the present embodiment does not require a process for installing a resistance applying portion. This improves the productivity of the long object guiding device 11.

Third Embodiment

A long object guiding device according to a third embodiment will now be described with reference to the drawings. The differences from the second embodiment will mainly be discussed, and detailed explanations of the common features are omitted. The same reference numerals are given to those components that are the same as the corresponding components of the second embodiment.

Figure 9:
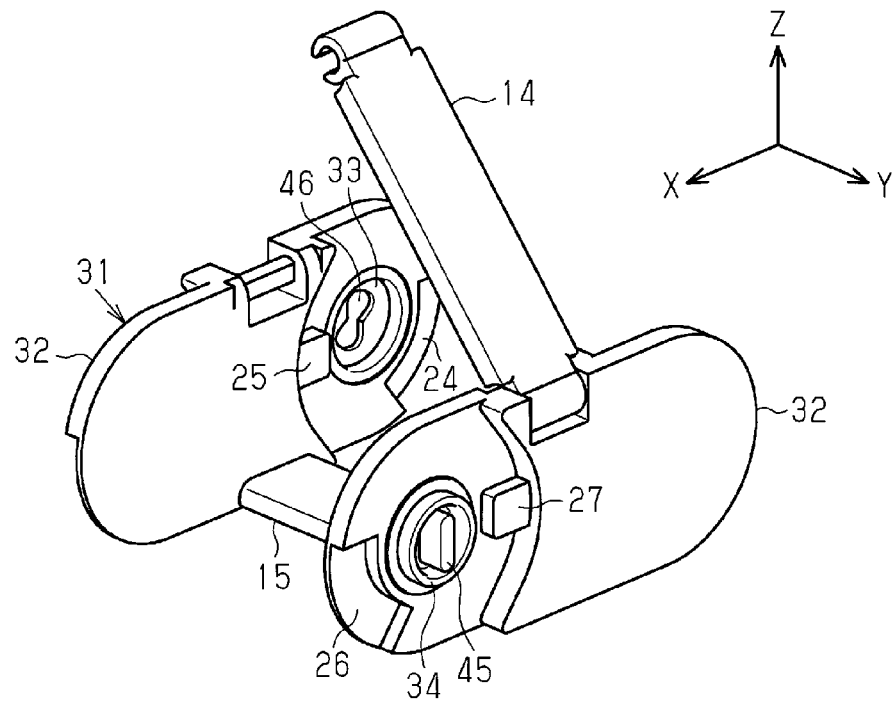
FIG. 9 is a perspective view of part of a device for guiding a long object according to a third embodiment.
Figure 10:
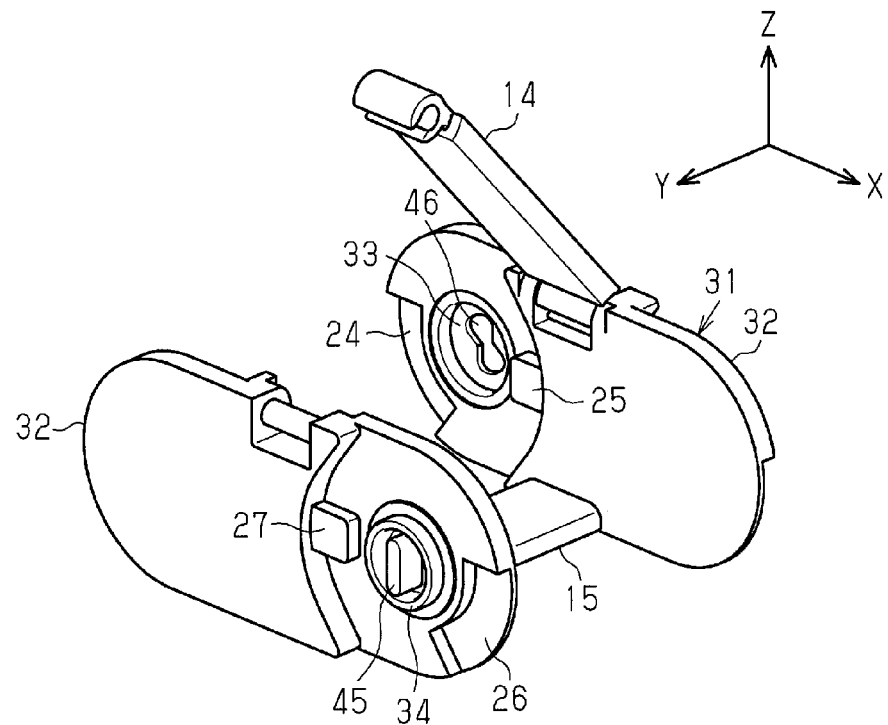
FIG. 10 is a perspective view of the part of the long object guiding device shown in FIG. 9, as viewed from the opposite side.

As shown in FIGS. 9 and 10, a long object guiding device 11 according to the third embodiment is different from that of the second embodiment in that the projection 35 is replaced by a projection 45, and the receiving recess 36 is replaced by an accommodating recess 46. The projection 45 is equivalent to the projection 35 of the second embodiment with a slightly extended measurement in the longitudinal direction. The accommodating recess 46 is equivalent to the receiving recess 36 of the second embodiment with the ends in the longitudinal direction are formed to be sectoral so that there is a constricted part at the center. The accommodating recess 46, which is an accommodating portion, is capable of accommodating the projection 45.

When the coupling recess 33 and the coupling projection 34 of two link portions 32 that are adjacent to each other in the second direction X are fitted to each other, the link portions 32 partly overlap with each other in the first direction Y, and the distal end of the projection 45 is inserted in the accommodating recess 46. The accommodating recess 46 allows the inserted projection 45 to pivot within a predetermined angle (40° in the present embodiment). That is, in a state in which the link portions 32 are at the initial position (the position shown by solid lines in FIG. 11), the accommodating recess 46 allows the projection 45 to pivot by 20° either toward the side corresponding to the straight position (the position shown by long dashed short dashed lines in FIG. 11) or toward the side corresponding to the flexed position (the position shown by long dashed double-short dashed lines in FIG. 11).

Thus, the accommodating recess 46 is configured such that the angular range within which the inserted projection 45 is allowed to pivot (40° in the present embodiment) is narrower than the pivoting range of the link portions 32 from the straight position to the flexed position (50° in the present embodiment). In the present embodiment, the projection 45 and the accommodating recess 46 constitute a resistance applying portion.

Next, operation will be described in which two link portions 32 (links 31) that are adjacent to each other in the second direction X pivot on each other from the initial position to the straight position or the flexed position.

Figure 11:
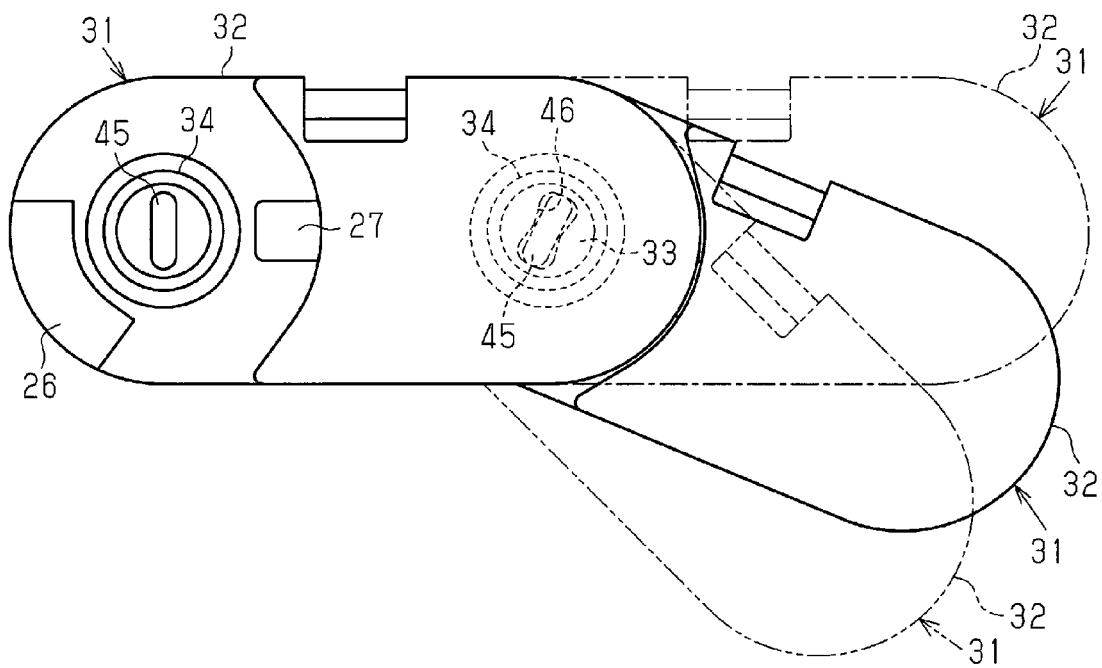
FIG. 11 is a side view illustrating a state in which the link portions according to the embodiment of FIG. 9 pivot on each other.

When causing two link portions 32 that are adjacent to each other in the second direction X to pivot on each other from the initial position to the straight position, one of the link portions 32 (the right one as viewed in FIG. 11) is caused to pivot on the other link portion 32 (the left one as viewed in FIG. 11) such that the link portions 32 are shifted from the initial position (the position shown by solid lines in FIG. 11) to the straight position (the position shown by long dashed short dashed lines in FIG. 11).

Then, the outer surface of the outer projection 27 contacts and engages with the inner surface of the inner recess 24 on a side corresponding to the straight position, and the outer surface of the inner projection 25 contacts and engages with the inner surface of the outer recess 26 on a side corresponding to the straight position. This achieves the straight position of the two link portions 32 (the links 31), which are adjacent to each other in the second direction X.

Figure 12:
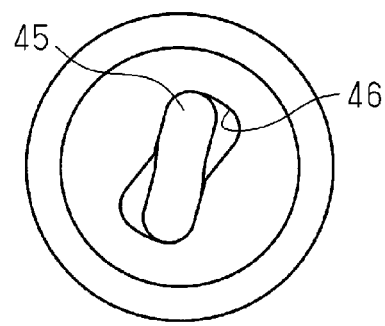
FIG. 12 is an enlarged diagram illustrating a state of the projection when the link portions shown in FIG. 11 are put in a straight position.

In this case, when the link portions 32 are at a position at which the angle between the longitudinal axes is in the range between 0° to 5°, that is, at a position at an end in the pivoting range from 0° to 50° of the link portions 32, part of the side surface of the projection 45 is elastically deformed in a curving manner by contacting the side surface of the accommodating recess 46 as shown in FIG. 12. The elastic force that accompanies the elastic deformation of the projection 45 is applied, as rotational resistant, to the link portions 32 when the link portions 32 are caused to pivot on each other from the initial position to the straight position.

This alleviates the impact of the contact of the outer surface of the outer projection 27 with the inner surface of the inner recess 24 and the impact of the contact of the outer surface of the inner projection 25 with the inner surface of the outer recess 26, thereby suppressing the impact noise produced by such contact.

In contrast, when causing two link portions 32 that are adjacent to each other in the second direction X to pivot on each other from the initial position to the flexed position, one of the link portions 32 (the right one as viewed in FIG. 11) is caused to pivot on the other link portion 32 (the left one as viewed in FIG. 11) such that the link portions 32 are shifted from the initial position (the position shown by solid lines in FIG. 11) to the flexed position (the position shown by long dashed double-short dashed lines in FIG. 11).

Then, the outer surface of the outer projection 27 contacts and engages with the inner surface of the inner recess 24 on a side corresponding to the flexed position, and the outer surface of the inner projection 25 contacts and engages with the inner surface of the outer recess 26. This achieves the flexed position of the two link portions 32 (the links 31), which are adjacent to each other in the second direction X.

Figure 13:
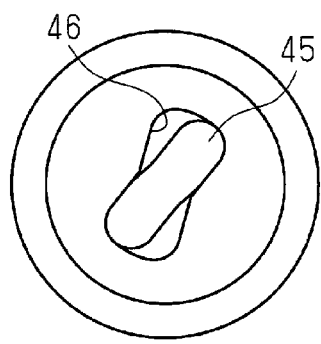
FIG. 13 is an enlarged diagram illustrating a state of the projection when the link portions shown in FIG. 11 are put in a flexed position.

In this case, when the link portions 32 are at a position at which the angle between the longitudinal axes is in the range between 45° to 50°, that is, at a position at an end in the pivoting range from 0° to 50° of the link portions 32, part of the side surface of the projection 45 is elastically deformed in a curving manner by contacting the side surface of the accommodating recess 46 as shown in FIG. 13. The elastic force that accompanies the elastic deformation of the projection 45 is applied, as rotational resistant, to the link portions 32 when the link portions 32 are caused to pivot on each other from the initial position to the flexed position.

This alleviates the impact of the contact of the outer surface of the outer projection 27 with the inner surface of the inner recess 24 and the impact of the contact of the outer surface of the inner projection 25 with the inner surface of the outer recess 26, thereby suppressing the impact noise produced by such contact.

Also, when the link portions 32 are at a position at which the angle between the longitudinal axes is in the range between 5° to 45°, that is, at a position outside the ends in the pivoting range from 0° to 50° of the link portions 32, the projection 45 is not elastically deformed as shown in FIG. 11, so that no rotational resistance is applied to the link portions 32. Thus, the pivoting motion of the link portions 32 is not unnecessarily hindered.

As described above, when the link portions 32 are caused to pivot on each other between the straight position and the flexed position, rotational resistance is applied to the link portions 32 only in a period from immediately before the link portions 32 are at the straight position to when the link portions 32 are at the straight position, and in a period from immediately before the link portions 32 are at the flexed position to when the link portions 32 are at the flexed position. That is, when the link portions 32 are caused to pivot between the straight position and the flexed position, rotational resistance is applied to the link portions 32 only in a period from immediately before the outer surface of the outer projection 27 contacts the inner surface of the inner recess 24 to when these surfaces contact and engage with each other, and in a period from immediately before the outer surface of the inner projection 25 contacts the inner surface of the outer recess 26 to when these surfaces contact and engage with each other. Thus, in the long object guiding device 11, the rotational resistance of the projection 45 does not unnecessarily hinder the pivoting motion of the link portions 32. This effectively suppresses the occurrence of noise during the use of the long object guiding device 11.

In addition to the above described advantage (7), the third embodiment achieves the following advantage.

(8) In the long object guiding device 11, when two link portions 32 that are adjacent to each other in the second direction X are coupled to each other, the projection 45 is inserted in the accommodating recess 46. When the link portions 32 pivot on each other while at an end in the pivoting range of the link portions 32, part of the side surface of the projection 45 contacts the side surface of the accommodating recess 46 and is elastically deformed to apply rotational resistance to the link portions 32. That is, when the link portions 32 are caused to pivot between the straight position and the flexed position, rotational resistance is applied to the link portions 32 only in a period from immediately before the outer surface of the outer projection 27 contacts the inner surface of the inner recess 24 to when these surfaces contact and engage with each other, and in a period from immediately before the outer surface of the inner projection 25 contacts the inner surface of the outer recess 26 to when these surfaces contact and engage with each other. Thus, when the link portions 32 pivot on each other between the straight position and the flexed position, so that the inner surface of the inner recess 24 contacts the outer surface of the outer projection 27 and the inner surface of the outer recess 26 contacts the outer surface of the inner projection 25, the accompanying impacts are alleviated. This suppresses, the impact noise produced due to the contact. Therefore, in the long object guiding device 11, the rotational resistance of the projection 45 does not unnecessarily hinder the pivoting motion of the link portions 32. This effectively suppresses the occurrence of noise during the use of the long object guiding device 11.

Modifications

The above described embodiments may be modified as follows.

In the first embodiment, the size, or the outer diameter, of the coupling portion 28c of the elastic member 28 may be changed as necessary. This allows the rotational resistance applied when the link portions 12 pivot on each other to be adjusted. Thus, the extent of reduction of noise during the use of the long object guiding device 11 can be appropriately adjusted.

In the first embodiment, the elastic member 28 may be attached to the link 13 while being inclined relative to the third direction Z such that the coupling portion 28c is not twisted at the halfway position in the pivoting range of the link portions 12. This configuration allows rotational resistance of the same magnitude to be applied to the link portions 12 when the link portions 12 are shifted to the straight position and when the link portions 12 are shifted to the flexed position.

In the first embodiment, the elastic member 28 may be attached to the link 13 while being inclined relative to the third direction Z such that the coupling portion 28c is not twisted at a position displaced from the halfway position in the pivoting range of the link portions 12.

In the first embodiment, the cross-sectional shape of the coupling portion 28c of the elastic member 28 may be a shape other than a perfect circle (for example, an elliptic shape or a polygonal shape).

In the first embodiment, at least one of the first attached portion 28a and the second attached portion 28b of the elastic member 28 does not necessarily need to be made of elastic material. That is, at least one of the first attached portion 28a and the second attached portion 28b may be made of a hard material.

In the second embodiment, the cross-sectional shape of the projection 35 may be changed as necessary. In this case, the shape of the receiving recess 36 is preferably changed in accordance with the cross-sectional shape of the projection 35.

In the second embodiment, the receiving recess 36 may be replaced by a through hole serving as a receiving portion that has the same shape as the receiving recess 36.

In the second embodiment, the longitudinal axis of the receiving recess 36 may agree with the third direction Z.

In the second embodiment, the longitudinal axis of the receiving recess 36 may be inclined relative to the third direction Z to be displaced from the halfway position in the pivoting range of the link portions 32.

In the third embodiment, the difference between the angular range within which the projection 45 inserted in the accommodating recess 46 is permitted to pivot and the pivoting range of the link portions 32 from the straight position to the flexed position may be changed as necessary. This allows the noise value during the use of the long object guiding device 11 to be adjusted.

In the third embodiment, the accommodating recess 46 may be replaced by a through hole serving as an accommodating portion that has the same shape as the accommodating recess 46.

In each of the above-illustrated embodiments, the resistance applying portion may be formed by a spring.

DESCRIPTION OF THE REFERENCE NUMERALS

11 . . . Long Object Guiding Device; 12, 32 . . . Link Portion; 13, 31 . . . Link; 14 . . . First Arm; 15 . . . Second Arm; 24 . . . Inner Recess constituting Restricting Portion; 25 . . . Inner Projection constituting Restricting Portion; 26 . . . Outer Recess constituting Restricting Portion; 27 . . . Outer Projection constituting Restricting Portion; 28 . . . Elastic Member as Resistance Applying Portion; 28a . . . First Attached Portion; 28b . . . Second Attached Portion; 28c . . . Coupling Portion; 35; 45 . . . Projection constituting Resistance Applying Portion; 36 . . . Receiving Recess as Receiving Portion constituting Resistance Applying Portion; 46 . . . Accommodating Recess as Accommodating Portion constituting Resistance Applying Portion; SK . . . Accommodation Space; TK . . . Long Object; X . . . Second Direction; Y . . . First Direction; Z . . . Third Direction

The invention claimed is:

1. A device for guiding a long object comprising:
a plurality of links;
pairs of link portions each provided in each link, wherein the link portions of each pair are opposed to each other in a first direction; and
pairs of arms, each of which couples the link portions of each pair to each other, wherein
the links are coupled together while being arranged in series in a second direction, which is orthogonal to the first direction,
each link has a first end and a second end in a third direction, which is orthogonal to both the first direction and the second direction,
the link portions of each pair are coupled to each other by the corresponding pair of the arms at the first end and the second end of the link,
the pairs of the link portions and the pairs of the arms define an accommodation space, which extends in the second direction and accommodates a long object,
each link portion includes a restricting portion, which restricts a pivoting range of link portions that are adjacent to each other in the second direction,
engagement between the restricting portions of two link portions adjacent to each other in the second direction restricts the pivoting range to a predetermined angular range, and
each link portion includes a resistance applying portion, wherein, when two link portions adjacent to each other in the second direction are caused to pivot on each other, the corresponding resistance applying portion applies rotational resistance due to elastic force to the link portions at least in part of the pivoting range, the resistance applying portion being disposed at least partially in a pivoting axis of the two link portions.

2. A device for guiding a long object comprising:
a plurality of links;
pairs of link portions each provided in each link, wherein the link portions of each pair are opposed to each other in a first direction; and pairs of arms, each of which couples the link portions of each pair to each other, wherein the links are coupled together while being arranged in series in a second direction, which is orthogonal to the first direction, each link has a first end and a second end in a third direction, which is orthogonal to both the first direction and the second direction, the link portions of each pair are coupled to each other by the corresponding pair of the arms at the first end and the second end of the link, the pairs of the link portions and the pairs of the arms define an accommodation space, which extends in the second direction and accommodates a long object, each link portion includes a restricting portion, which restricts a pivoting range of link portions that are adjacent to each other in the second direction, engagement between the restricting portions of two link portions adjacent to each other in the second direction restricts the pivoting range to a predetermined angular range, each link portion includes a resistance applying portion, wherein, when two link portions adjacent to each other in the second direction are caused to pivot on each other, the corresponding resistance applying portion applies rotational resistance due to elastic force to the link portions at least in part of the pivoting range, each resistance applying portion includes
a first attached portion, which is attached to one of two link portions adjacent to each other in the second direction,
a second attached portion, which is attached to the other link portion, and
a coupling portion, which couples the first attached portion and the second attached portion to each other, and the coupling portion is made of an elastic material.

3. A device for guiding a long object comprising:
a plurality of links;
pairs of link portions each provided in each link, wherein the link portions of each pair are opposed to each other in a first direction; and
pairs of arms, each of which couples the link portions of each pair to each other, wherein
the links are coupled together while being arranged in series in a second direction, which is orthogonal to the first direction,
each link has a first end and a second end in a third direction, which is orthogonal to both the first direction and the second direction,
the link portions of each pair are coupled to each other by the corresponding pair of the arms at the first end and the second end of the link,
the pairs of the link portions and the pairs of the arms define an accommodation space, which extends in the second direction and accommodates a long object, each link portion includes a restricting portion, which restricts a pivoting range of link portions that are adjacent to each other in the second direction, engagement between the restricting portions of two link portions adjacent to each other in the second direction restricts the pivoting range to a predetermined angular range, each link portion includes a resistance applying portion, wherein, when two link portions adjacent to each other in the second direction are caused to pivot on each other, the corresponding resistance applying portion applies rotational resistance due to elastic force to the link portions at least in part of the pivoting range, each link portion has a first end and a second end in the second direction, the resistance applying portion of each link portion includes
a projection, which is provided at the first end of the link portion and is made of an elastic material, and
a receiving portion, which is provided at the second end of the link portion and is capable of receiving the projection, and when two link portions adjacent to each other in the second direction are coupled to each other to partly overlap with each other in the first direction, the projection of one of the two adjacent link portions is received by the receiving portion of the other one of the two adjacent link portions.

4. The device for guiding a long object according to claim 3, wherein each projection is received by the corresponding receiving portion with the corresponding two link portions adjacent to each other in the second direction held at a position corresponding to a midpoint in the pivoting range.

5. The device for guiding a long object according to claim 1, wherein
each link portion has a first end and a second end in the second direction,
the resistance applying portion of each link portion includes
a projection, which is provided at the first end of the link portion and is made of an elastic material, and
an accommodating portion, which is provided at the second end of the link portion and is capable of accommodating the projection,
when two link portions adjacent to each other in the second direction are coupled to each other to partly overlap with each other in the first direction, the projection of one of the two adjacent link portions is accommodated in the accommodating portion of the other one of the two adjacent link portions, and
when the link portions pivot on each other while at an end in the pivoting range of the link portions, part of the corresponding projection contacts the corresponding accommodating portion and is elastically deformed to apply rotational resistance to the link portions.

* * * * *